United States Patent
Keohane et al.

(10) Patent No.: US 9,886,685 B2
(45) Date of Patent: Feb. 6, 2018

(54) DISTRIBUTED DIGITAL RIGHTS-MANAGED FILE TRANSFER AND ACCESS CONTROL

(71) Applicant: International Business Machines Corporation, Armonk, NY (US)

(72) Inventors: Susann M. Keohane, Austin, TX (US); Gerald F. McBrearty, Austin, TX (US); Shawn P. Mullen, Buda, TX (US); Jessica C. Murillo, Round Rock, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/084,525

(22) Filed: Mar. 30, 2016

(65) Prior Publication Data
US 2016/0224957 A1  Aug. 4, 2016

Related U.S. Application Data

(63) Continuation of application No. 14/608,339, filed on Jan. 29, 2015.

(51) Int. Cl.
*G06Q 20/12* (2012.01)
*H04L 29/08* (2006.01)
(Continued)

(52) U.S. Cl.
CPC ......... *G06Q 20/1235* (2013.01); *G06F 21/10* (2013.01); *G06F 21/31* (2013.01);
(Continued)

(58) Field of Classification Search
CPC ..... G06Q 20/1235; G06F 21/10; G06F 21/31; G06F 21/6209; H04L 67/32; H04L 63/10; H04L 2463/101
See application file for complete search history.

(56) References Cited

U.S. PATENT DOCUMENTS 5,892,900 A * 4/1999 Ginter .................... G06F 21/10
726/26
6,195,649 B1 * 2/2001 Gifford ................ G06Q 10/087
705/14.51
(Continued)

FOREIGN PATENT DOCUMENTS

WO     2006029059 A2    3/2006

OTHER PUBLICATIONS

Mell et al., "The NIST Definition of Cloud Computing," National Institute of Standards and Technology, U.S. Department of Commerce, Special Publication 800-145, Sep. 2011, 7 pages.
(Continued)

*Primary Examiner* — Calvin L Hewitt, II
*Assistant Examiner* — Dennis G Keritsis
(74) *Attorney, Agent, or Firm* — Nolan M. Lawrence

(57) ABSTRACT

A system for transferring digital rights managed (DRM) files from a first seller device to a buyer device involves a buyer device configured to receive a file package having the DRM file. Some file packages may also have a DRM file access key. The system also has a first seller device having the DRM file stored thereon and configured to receive a request to purchase the DRM file (the request having a DRM file identifier); receive a buyer identifier associated with the request; transfer the file package to a buyer device to the buyer device; detect through a network connection, a digital rights management server; and send, responsive to detecting the digital rights management server, a sale record to the digital rights management server, where the sale record includes the DRM file identifier and the buyer identifier.

1 Claim, 6 Drawing Sheets

(51) Int. Cl.
*H04L 29/06* (2006.01)
*G06F 21/31* (2013.01)
*G06F 21/62* (2013.01)
*G06F 21/10* (2013.01)

(52) U.S. Cl.
CPC .......... *G06F 21/6209* (2013.01); *H04L 63/10* (2013.01); *H04L 67/32* (2013.01); *H04L 2463/101* (2013.01)

(56) References Cited

U.S. PATENT DOCUMENTS

| | | | |
|---|---|---|---|
| 6,226,618 B1 * | 5/2001 | Downs | G06F 21/10 |
| | | | 380/279 |
| 9,129,092 B1 * | 9/2015 | Dorwin | G06F 21/6209 |
| 9,424,400 B1 * | 8/2016 | Blankenbeckler | H04L 9/006 |
| 9,626,667 B2 * | 4/2017 | Boccon-Gibod | G06Q 20/1235 |
| 2006/0265333 A1 | 11/2006 | Gomes et al. | |
| 2008/0065911 A1 | 3/2008 | Elazar et al. | |
| 2012/0226536 A1 | 9/2012 | Kidron | |
| 2013/0297385 A1 | 11/2013 | Mehta et al. | |

OTHER PUBLICATIONS

Keohane et al., "Distributed Digital Rights-Managed File Transfer and Access Control", U.S. Appl. No. 14/608,339, filed Jan. 29, 2015.

IBM, List of IBM Patents or Patent Applications Treated as Related, Jul. 20, 2016, 2 pages.

* cited by examiner

US 9,886,685 B2

DISTRIBUTED DIGITAL RIGHTS-MANAGED FILE TRANSFER AND ACCESS CONTROL

BACKGROUND

The present disclosure relates to digital rights managed (DRM) files and methods of transferring DRM files and regulating access to DRM files. Digital rights managed files may be transferred and stored on computing devices such as personal computers, digital telephones, and tablet computers. File transfers may be performed while a computing device has a connection to a store for digital rights managed files. In some circumstances, however, a person may wish to receive an authorized copy of a digital file such as a song, video, or game without having an active network connection to an online store that sells and delivers DRM files.

SUMMARY

Certain embodiments are directed towards a method for transferring a digital rights managed (DRM) file between a seller device and a buyer device. The method comprises: receiving, on a seller device, a request to transfer the DRM file to a buyer device (the request having a DRM file identifier); receiving, on the seller device, a buyer identifier associated with the request; and transferring, from the seller device to the buyer device, and over a direct connection between the seller device and the buyer device, a file package having the DRM file and a first DRM file access key. The method also comprises detecting, through a network connection, a digital rights management server; and sending, responsive to detecting the digital rights management server, a sale record to the digital rights management server, the sale record having at least the DRM file identifier and the buyer identifier.

Various embodiments are directed toward a method of regulating access to a digital rights managed (DRM) file, the method comprising: receiving, from a first seller device, a sale record that includes a DRM file identifier and a buyer identifier; adding the DRM file identifier to a list of authorized DRM files associated with the buyer identifier; and creating a first DRM file access key associated with the DRM file identifier. The method also comprises verifying that a buyer device is authorized to receive the first DRM file access key; and sending, in response to the verifying, to each seller device having the sale record stored thereon that communicates with the digital rights management server, a sale confirmation package having at least the DRM file identifier, the buyer identifier, and the first DRM file access key.

Some embodiments are directed toward a system for transferring a digital rights managed (DRM) file from a first seller device to a buyer device. The system can comprise a buyer device configured to receive a file package having the DRM file and a first DRM file access key. The system can also comprise a first seller device having the DRM file stored thereon and configured to receive a request to purchase the DRM file, the request having a DRM file identifier; receive a buyer identifier associated with the request; transfer the file package to the buyer device; detect through a network connection, a digital rights management server; and send, responsive to detecting the digital rights management server, a sale record to the digital rights management server, the sale record including the DRM file identifier and the buyer identifier.

The above summary is not intended to describe each illustrated embodiment or every implementation of the present disclosure.

BRIEF DESCRIPTION OF THE SEVERAL VIEWS OF THE DRAWINGS

The present disclosure relates to digital rights managed (DRM) files and methods of transferring DRM files and regulating access to DRM files. The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
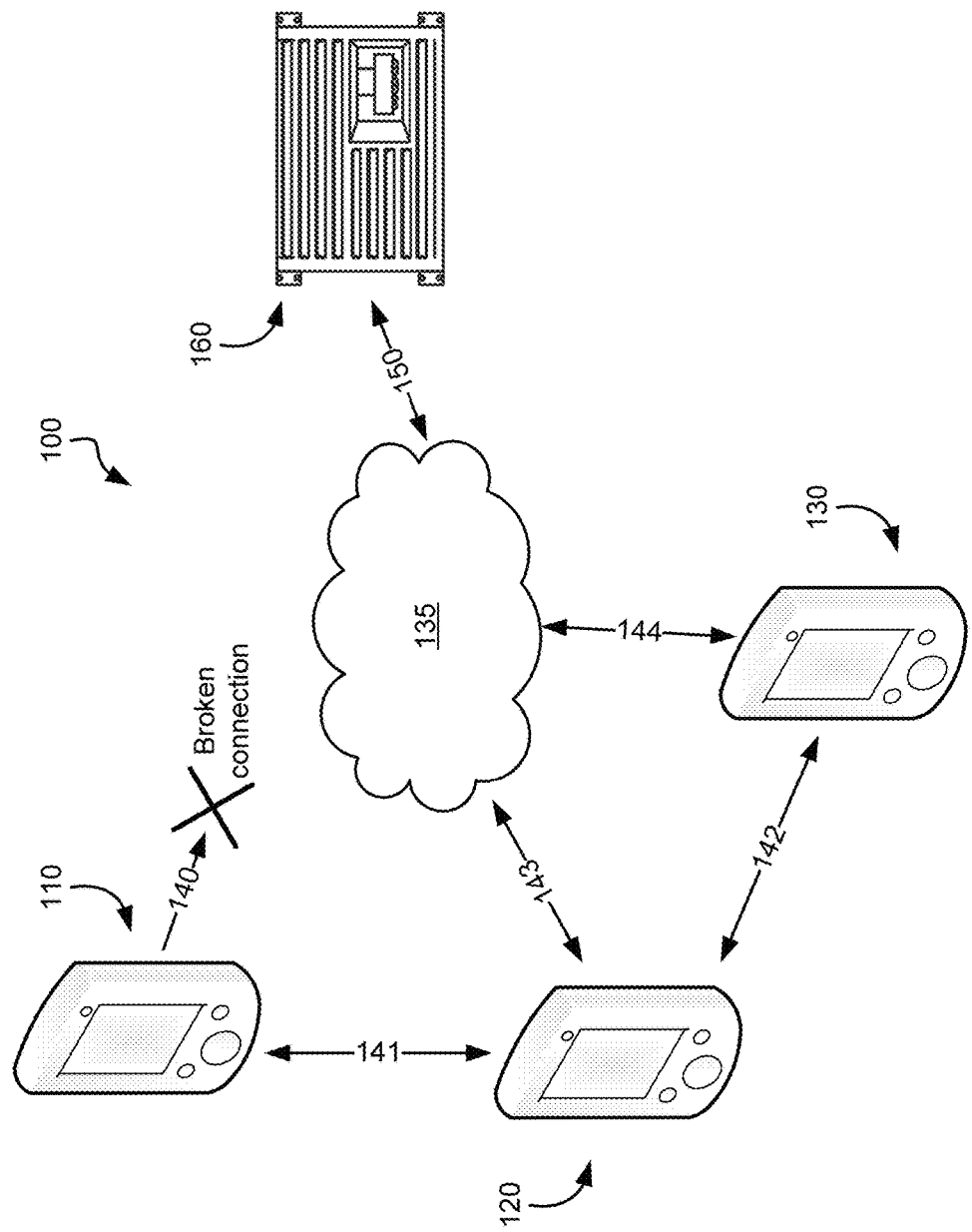
FIG. 1 shows a system of interconnected devices that can communicate to transfer files and file access control credentials, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to transfer and licensing of digital rights managed files, and more particular aspects relate to methods of transferring DRM files and access control credentials between a buyer device (a buyer's computing device) and an online store (with a digital rights management server) for DRM files. Digital rights managed files such as music files, video files, electronic books or other text-based files, and interactive files (programs or applications) such as text editors, picture editors, communication programs, electronic games, or interactive media files may be transferred from a DRM file store to computing devices such as personal computers, digital telephones, and tablet computers. In some instances, file transfers can be performed while a computing device has a direct connection, over a network, to a store for digital rights managed files. In some circumstances, however, a person may wish to download a digital file without having an active network connection to an online store that sells DRM files. A file may also be transferred to a buying device from another personal device such as a personal computer, digital telephone, or tablet computer, using an authorized copy of a selected DRM file that already exists on the other personal device, rather than requesting the DRM file from a DRM file store. A seller device may act as an intermediary, facilitating the DRM file transfer process by acting as a local, authorized DRM file distribution locus. Device-to-device DRM file transfer can take place over local, sometimes ad hoc, connections between devices or over networks isolated from the broader Internet, facilitating the distribution of DRM files at times when a DRM file store is not available to a DRM file buyer.

A seller application, a computer program running on devices participating in the file transfer process, can act as an agent or intermediary for a file transfer that does not rely upon direct communication with a file repository (e.g., a database, an online store, or a digital rights-managed file store (DRM file store)). In embodiments, the seller application can run on the both a seller device and a buyer device to perform DRM file transfer. The seller application can receive a request for a DRM file, receive identifying information about the buyer and the buyer's device, and transfer a copy of a DRM file on a seller device to the buyer's device without either device accessing a copy of the DRM file at the DRM file store. The request to transfer a DRM file may be transmitted from a buyer device to a seller device over a local wireless connection, or may be directly entered into the seller application running on a seller device by the seller or buyer. In some embodiments, to make the request, the buyer or seller may be able to browse, with the seller application, through a list of DRM files that are already stored on the seller device and are available to be transferred to buyer devices. Some embodiments may provide a larger list of DRM files that are available for either immediate transfer (because they are already on the seller device) or for subsequent transfer once they have been downloaded to the seller device.

The timing of the DRM file transfer can depend on the status of the seller device (whether or not a copy of the requested DRM file is present on the seller device). When the seller device receives a request to transfer a DRM file and the file is present on the seller device, the DRM file transfer can proceed soon thereafter. Some embodiments may have a buyer device send a file transfer request to a seller device for a particular DRM file to be transferred when the DRM file is not currently stored on the seller device. In embodiments where the seller device does not have a copy of the DRM file stored thereon, a request to transfer a DRM file may be stored on the seller device and acted upon at a later time. For example, after receiving a request to transfer a DRM file and the seller subsequently downloads the DRM file to the seller device, the DRM file transfer can proceed when the buyer device is near the seller device and they form a connection. In some embodiments, the seller may receive the download of the requested DRM file without being able to access it directly during the DRM file transfer process.

DRM file transfer may also include transfer of file access control credentials at the time the DRM file is transferred, or at a later time. File access control credentials may include a DRM file access key that can unlock a locked DRM file to varying degrees, according to the type of DRM file that was transferred. DRM file access keys may be configured to provide varying degrees of access to data or content in a DRM file, to last for varying amounts of time, and to provide varying degrees of control over functions or instructions in a DRM file that is executed by a buyer device. These three types of file access control can be configured independently in various embodiments of the DRM file access keys described herein. Access to a DRM file can include the ability to watch, play, listen to, read, or execute the DRM file.

In some embodiments, a buyer can receive a DRM file access key after a seller device informs a digital rights management server of the file transfer to a buyer or buyer device and the rights management server verifies that the buyer or buyer device is authorized to access to some or all of the DRM file. Such verification may include determining whether payment authorization for access to the DRM file has been paid for, or whether a buyer or buyer device falls under the terms of a "family plan" or "site license" to programs or content contained in DRM files. A DRM file access key may be configured to provide appropriate access to DRM file content and features or instructions for the appropriate amount of time (according to payment terms or licensing terms). DRM file access keys may also be configured to work, in some embodiments, on a specific buyer device or on a set of buyer devices associated with a single buyer.

When DRM file access keys are included with a DRM file transfer to a buyer device before a seller device communicates with a digital rights management server, the access key may be configured for reduced file access, such as allowing a user to preview a portion of the DRM file or to use a limited subset of application functions that the DRM file can perform. In some embodiments, time limits in DRM file access keys may allow a user to access DRM file content for a limited period of time (such as a few hours or days), while some embodiments may be configured to provide much longer access periods. Some DRM file access keys may be configured to provide permanent access to a DRM file on one or more buyer devices.

In some embodiments, a first DRM file access key that accompanies the DRM file transfer may be replaced later by a second DRM file access key received from a digital rights management server in order to provide the user with greater access to the content or functions of the DRM file. Certain embodiments may be directed toward DRM file transfers where the DRM file access key received from a digital rights managements server is the first file access key for a DRM file received on the buyer device.

DRM file access keys can be generated by a digital rights management server responsive to receiving the sale record from a seller device and verifying that the buyer or buyer's device has permission to access the DRM file. Some embodiments may further examine the scope of DRM file access appropriate for the buyer. A sale record can contain information about the DRM file and the devices involved in the file transfer, including at least the buyer's request for the DRM file, in order to facilitate the creation of new DRM file access keys. While the present disclosure is not necessarily limited to such applications, various aspects of the disclosure may be appreciated through a discussion of various examples described herein.

A buyer may not be able to immediately download a file in situations such as when the buyer's device does not have access to a network to communicate with the online store (the DRM file store). In some embodiments, a buyer device may be unable to download a DRM file from an online store. In some situations, a file transfer may be difficult to complete within a limited amount of time because of an intermittent connection between the device and the online store, or because the data transfer speed of a reliable connection may be slow while the DRM file size may be large. In some circumstances, a buyer's device may be in an area with strong signal from, e.g., a wireless network, but not have access permissions to the network, as when the buyer and buyer device are at another person's home, or when the buyer is in a commercial space that provides network access to employees but not the public. The buyer may, however, be near a person who has previously downloaded the particular DRM file that the buyer wishes to purchase and download from a digital rights managed file store (a DRM file store, or an online store). A wireless connection may be an optical communication protocol such as infrared (IR) transfer, or an electronic protocol such as a Bluetooth communication frequency, using an automatic network formation protocol (such as Bonjour®, DHCP (Dynamic Host Configuration Protocol), or some other networking protocol).

FIG. 1 shows an exemplary system 100 of devices that can communicate with each other and a digital rights management server to accomplish DRM file transfer and to share file access permissions, according to embodiments of the present disclosure. FIG. 1 depicts devices involved in DRM file transfers and communication of file access control credentials. A Seller with a seller device 120 (such as a smartphone) may show a DRM file (a music video) to her visiting friend Buyer while at Seller's house. Buyer may decide to purchase and download the music video but then realize she may not have access to a network to do so (i.e., not be able to form a connection 140 to a network 135), and so requests that her friend, Seller, help her to perform the process of obtaining an authorized copy of the DRM file to download to her device (buyer device 110). Seller can establish a connection 141 between seller device 120 and buyer device 110 to assist in the file transfer. Buyer requests file transfer of the music video from seller device 120 to buyer device 110 by entering information into an application (seller application) on one of the devices. Upon entry of the information, seller device 120 can transfer the DRM file (the music video) to buyer device 110, along with a DRM file access key.

In embodiments, a seller application running on seller device 120 may also undertake other actions. The seller application on the seller device 120 may communicate with a rights management server at an online store to inform the server about the DRM file transfer. The seller application on seller device 120 may also receive an extended DRM file access key from the rights management server for later transfer to the buyer device 110. These actions may be performed closely together in time, or may be performed with an extended period of time between them. In some embodiments, different devices may perform each of these functions, and multiple devices may perform (or attempt to perform) each of these functions.

In some instances, the seller application has access to a computer network 135 over a network connection 143 at the same time that the DRM file is being transferred. Computer network 135 may include one or more computer networks, including computers attached to wired network connections, servers, gateways, routers, and computers attached to wireless networks such as wireless networks and cellular telephone networks. The seller application can detect the digital rights management server 160 connected (by direct connection 150) to the network 135 and transfer a record of the DRM file download (as part of a sale package) right away, perhaps even while the DRM file transfer to the buyer device is taking place. In some instances, the seller application may not have immediate access to a computer network (i.e., the seller device 120 may not be able to establish connection 143). The seller application can be configured to wait until the network connection 143 was reestablished before performing the steps of detecting the digital rights management server and transferring the sale package to the digital rights management server.

Consistent with embodiments, the seller device can distribute the sale package to other devices running a copy of the seller application. Any of these other devices can then complete the transfer of the sale package to the digital rights management server. The various devices can function as a mesh network of devices. The third device 130 shows an example of an additional device running the seller application. The various devices can be linked to each other over localized, ad hoc, connections, and anyone one of the devices can then accomplish the transfer of the sale package to the digital rights management server.

For example, if a third person, with a third device 130 and another copy of the seller application, were present with the buyer and the seller (or encountered later by either the buyer or the seller), the third person might have a connection 144 to a computer network that could perform the functions of communicating the DRM file transfer to, and receiving file access keys from, a rights management server 160. The third device 130 could receive the information about the DRM file transfer from either the buyer device or the seller device (such as over a local connection 142, or the combination of connections 141 and 142), and then perform the steps of detecting the digital rights management server 160 on the computer network 135 and transferring the sale package to the rights management server.

In some embodiments, the sale package might be transferred directly from the buyer device or the seller device to the digital rights management server. The seller device 120 and the buyer device 110 might not have a direct connection to a computer network to communicate with the digital rights management server between the time the DRM file transfer takes place and when the DRM file access key arrives on the buyer device 110.

Figure 2:
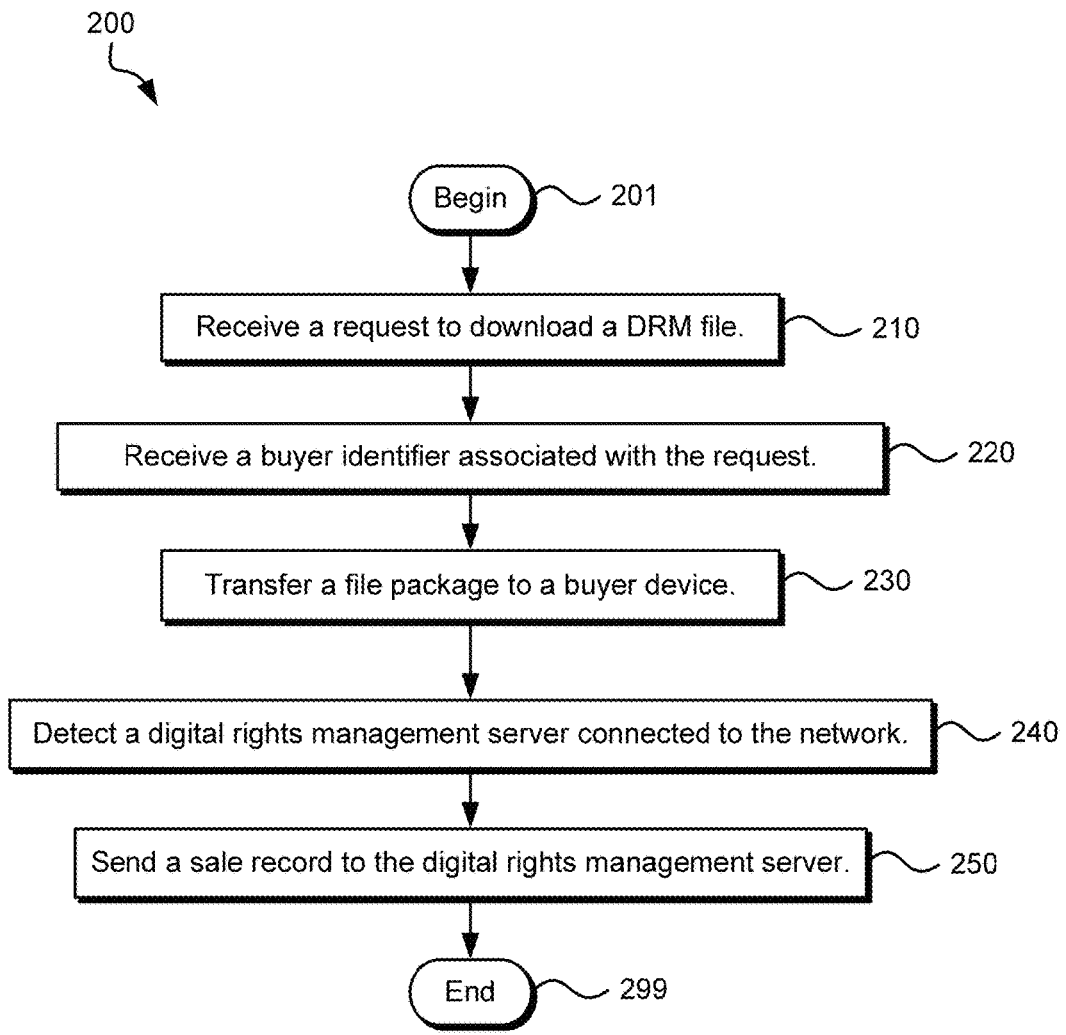
FIG. 2 depicts a method for transferring a digital rights managed (DRM) file from a seller computing device to a buyer computing device, according to embodiments of the present disclosure.

FIG. 2 depicts a method 100 for transferring a digital rights managed (DRM) file to a buyer computing device (the buyer device) and communicating the transfer to a store for DRM files (a DRM file store), according to embodiments of the present disclosure. The method can involve transferring a locked, encrypted, or access-controlled file to a buyer device from a seller device running a computer program product called a seller application. A seller device may have previously received a copy of the DRM file selected for download. The buyer device may receive the transferred DRM file directly from the seller device, without a direct connection to an online store (a DRM file store). The method can also involve one or more seller applications receiving information regarding the DRM file transfer and sending the information to a DRM file store. The method can use one or more seller devices or seller applications to circumvent a buyer's lack of connection to an online store when transferring a DRM file to the buyer's device. The method begins in block 201.

The method may have a step wherein a seller or a seller application receives a request, from a buyer or file recipient, to download a particular digital rights managed (DRM) file, as shown in block 210. In the method, the seller or seller application can also receive a buyer identifier associated with the request download the DRM file, as shown in block 220. The request to download the file may come over the wireless network, a wired network, or may be performed on the seller's device by the buyer, according to embodiments. In some embodiments, the buyer device can send the seller application a request to download the desired DRM file consistent with either buying or renting (licensing for an indefinite time or a limited amount of time) the file. A buyer identifier may include the buyer's name and email address, an identifier associated with an account at an online store that sells DRM files, a password to the online account, a buyer device identifier (such as a MAC address, a hardware component, or a software key linked to the operating system running on the device), and combinations thereof.

The request to download a file can include various kinds of information relevant to identifying the particular file to be downloaded, including the name of the file, the operating system of the device where the file is to be downloaded, a buyer identifier to link the file transferred to a particular person or organization, and a device identifier for the device to which the file and any DRM file access keys can be copied. A buyer identifier may include, but is not limited to, an account name on an online store that a buyer has previously used to download files, a hardware identifier key or buyer device identifier associated with a buyer device, a username, a password, and a buyer's real (public) name as well as information about the buyer's domicile. A buyer identifier may also include a form of identity verification including a username and password at an online store, a driver's license or government-issued identification. Some forms of identity verification may also provide access to funds that can pay for DRM file transfers and access keys, such as information linked to financial accounts such as a bank account, a credit card or debit card account, and information that provides access to Bitcoin or other digital or online currencies. Some forms of buyer identifiers or buyer information that can link a transferred DRM file to a single user or buyer device (or class of buyer devices if identified with an authorization code in software running on the buyer device). Examples of groups or classes of persons authorized to transfer and access a DRM file associated with a single account at an online store can include family members of an account holder, employees of a company, or other persons selected by an account holder under the terms of an online store account.

In response to the request to download, the seller application can perform a DRM file transfer to the requesting device, such as the buyer device, as described in block 230. For example, on a seller's device where the desired DRM file has been previously downloaded, a seller application can receive a request to download the desired DRM file to a buyer device. The buyer device may also be running a copy of the seller application. When the desired DRM file is already on the seller device, the seller device may transfer a copy of the DRM file to the buyer device via a direct, point-to-point connection formed between the two devices when they are brought close to each other or over an ad hoc wireless network that can include other devices as part of the network.

Scope of DRM file access and duration of buyer's ability to access the DRM file content or functions may vary according to the configuration of the DRM file and whether a buyer has completed payment for temporary, permanent, or full access to the DRM file content or functions. A DRM file may be accessible to a buyer for varying amounts of time according to the kind of file access key that a buyer receives, either from the seller device at the time of the DRM file transfer, of from a digital rights management server after the server has verified that the buyer or buyer device is authorized to have a different key than was provided with the DRM file when the DRM file was originally transferred. In some embodiments, the buyer may be able to access different subsets of the functions of the DRM file according to the kind of DRM file access key that is available. For example, a buyer may have a file access key that provides access to basic editing functions of a photo-editing application when the application (DRM file) is first downloaded to the buyer device. When received from a rights management server, an extended access key can give the buyer access to all the functions in the photo-editing application. Such extended access may be subscription-based, where continuing full function access can be extended on, e.g., an annual basis. In the context of a DRM file such as a movie or music video, some DRM file access keys may give a buyer the ability to access a "trailer" of the file (a short preview of the file's content). In some embodiments, file access keys can provide access to the full DRM file for a limited period of time (days, weeks, a year, etc.). Some DRM file access keys can provide a buyer with permanent access, according to the content of the sale record transferred to the rights management server and the content of the sale confirmation received from the rights management server. Some DRM file access keys can unlock multiple "levels" of a game application with many different stages or level of play or user interaction, additional subsets of features of a program or application downloaded to the buyer device, and additional "chapters" in an electronic book or other text.

A seller device can communicate with a rights management server or an online store in order to report the DRM file transfer from the seller device to a buyer device. A seller application may detect the presence of a digital rights management server through a computer network, as described in block 240. The digital rights management server may be associated with an online store that regularly downloads files, including DRM files, to consumers.

After detecting the digital rights management server, the seller application can send a sale record to the to the digital rights management server, as described in block 250. A sale record can be a file or series of files that contain information about the DRM file transfer. The sale record can include a DRM file identifier (including at least the name of a DRM file transferred to the buyer device, and other information associated with the DRM file), the type of file access key transferred to the buyer device (including, but not limited to, the date of key creation, the scope of DRM file access permissions accorded by the key, whether an expiration date exists for the key), and the buyer identifier. An expiration date for a license to view, access or use a DRM file may lead to a DRM file access key with an expiration time after a license period ends. The sale record can also contain buyer identification such as a buyer device identifier (linked to a single device or a set of devices owned by a person or organization), the date of the file package transfer, any online store account credentials for the buyer, as well as payment authorization (for circumstances where a buyer does not have an account with the store where the seller application originally downloaded the DRM file), and similar transactional elements.

Payment authorization in a sale record may include information encrypted by a buyer or buyer device that can be decrypted by an online store or a digital rights management server, according to embodiments. The seller device and seller application can thus act as conduits or intermediaries for the sale record and the payment authorization, without having access to the buyer's financial information or account information. Payment authorization can include an account login identity and password to an online store, bank account information, credit or debit card account numbers and personal access codes, links to Bitcoin or other digital/online currency, or other methods of enabling an online store or rights management server to compensate the seller, the DRM file owner, the online store, or any other person involved in licensing the DRM file to compensation for their role(s) in providing copies of the DRM file to the buyer.

According to aspects of the present disclosure, functions of the seller application, as described herein, may be performed by a single seller application on a single seller device. The functions may also be distributed among several seller devices running the seller application. For example, in some embodiments where the functions are distributed, a first seller application can transfer a file package with DRM file and DRM file access key to a buyer device, and, after receiving the buyer identifier and transferring the DRM file package to the buyer device, can act as a conduit for the sale record to an online store. A second seller application may, when in proximity to the buyer device or the seller device, also receive the buyer identifier and information regarding the DRM file transfer to the buyer device, and perform the sale record transfer to the online store independent of the first seller application. The transfer of the sale record to the digital rights management server at an online store for DRM files may be performed by either, or both, of the seller applications to assist the buyer device receiving all the DRM file access keys that should accompany the eventual payment of funds to the DRM file store in the transaction.

According to aspects of the present disclosure, the buyer/seller devices may communicate with many seller applications that a DRM file transfer has taken place. A buyer device may run the seller application, or some other application (a communication application), which application can communicate with multiple seller applications/seller devices to transmit the sale record to an online store or a rights management server. The buyer device can use multiple seller devices to carry the sale record to the online store or rights management server. As one as one seller device actually carries the sale record to the rights management server, the rights management system can generate extended access keys for the DRM file on the buyer device. The sale record can include information about the original DRM file transfer to the buyer device, including a DRM file identifier, a buyer identifier, a buyer device identifier (software key, hardware identifier, etc.), the date of the transfer, and account information on an online store.

For example, when a buyer device runs the seller application or a communication application and detects a new (second, third, etc.) seller device running the seller application or communication application, the buyer device can send the seller device a copy of the sale record to each of the seller devices. Any one of the seller devices (including the first seller device) can be the first to deliver the sale record to the rights management server. The sale record transfer can be an automatic transfer and can, in embodiments, occur with each new appropriately configured detected seller device.

A rights management server can act in a somewhat similar manner once it receives a sale record. The rights management server can, responsive to receiving the sale record, generate a sale confirmation package for the buyer device and put the sale confirmation package on each seller device that detects the rights management server, carries the file package, and does not already have a sale confirmation package stored thereon. The sale confirmation package may include an extended DRM file access key, generated after verifying that the buyer device is authorized to receive the extended DRM file access key (such as after buyer's payment for extended file access is successfully processed or completed, or verification that a DRM file access subscription is active or current). Any device carrying the sale confirmation package may be the first to transfer the sale confirmation package back to the buyer device using the seller application or another communication application.

Once a buyer device receives a sale confirmation package from any seller application that has communicated with the rights management server (whether running on a seller device or the buyer device), the automatic sale record transfer to newly detected seller devices can stop. According to embodiments, the buyer device can further communicate with the rights management server or online store, directly or using a seller device proxy, to trigger the rights management server to stop sending sale confirmation packages to devices carrying the sale record when they communicate with the rights management server.

Buyer device and seller devices may discover each other automatically when brought into proximity, according to aspects of the disclosure. In some embodiments, the communication of the buyer device with seller applications on other computing devices may be performed on a manual basis triggered by the buyer using the buyer device, or a copy of the seller application on the buyer device. The method ends in block 299.

Figure 3:
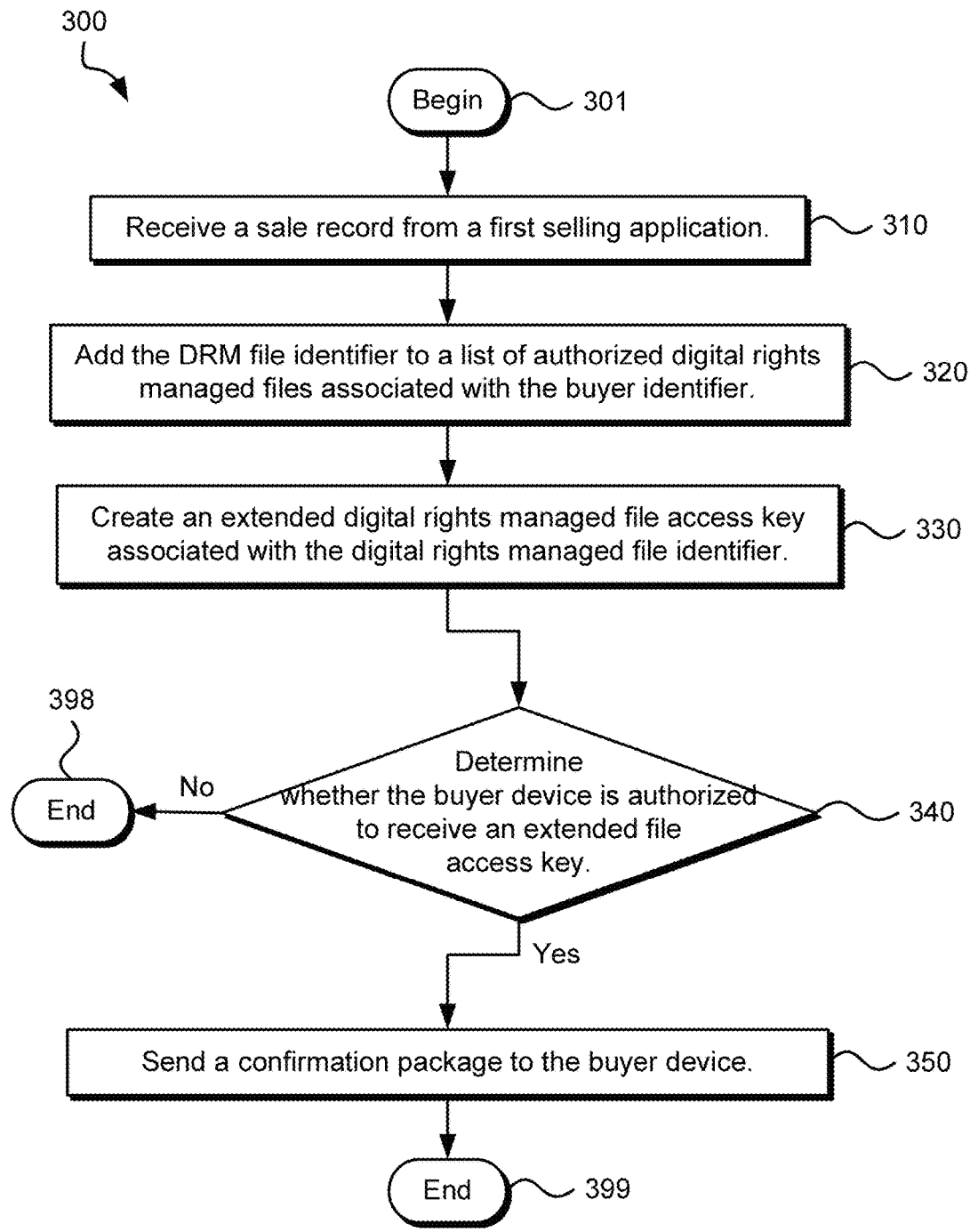
FIG. 3 shows a method of regulating access to a digital rights managed (DRM) file transferred to a buyer device, according to aspects of the present disclosure.

FIG. 3 shows a method 300 of regulating access to a digital rights managed file transferred to a buyer device, according to aspects of the present disclosure. The method can use a distributed protocol of communicating a digital rights managed (DRM) file access key from a digital rights management server to a buyer device where a DRM file transfer occurred. The method begins in block 301. A digital rights management server may receive a sale record from a seller application on a seller device connected to a computer network, as described in block 310. The digital rights management server and the seller application may have an automatic process by which the seller application announces to the digital rights management server that there is a DRM file transfer transaction that can be recorded by the rights management server. In some instances the rights management server may initiate a query to each seller application that connects to it to determine whether a "third party" DRM file transfer can be recorded.

The rights management server can, upon receiving the sale record from the seller application, extract the DRM file identifier and the buyer identifier from the sale record. The rights management server can also add the DRM file identifier to a list of authorized digital rights managed files associated with the buyer identifier, as indicated in block 320. When the buyer has performed previous downloads from the rights management server, or from seller applications associated with the DRM file server, the addition may be to a preexisting list. When there is no preexisting list of DRM file identifiers associated with a buyer identifier, the rights management server may create a new list associated with the buyer identifier. The buyer identifier may be a person's name, a person's email address, a username, or some other alphanumeric identifier, or a buyer device identifier associated particular physical components on the buyer device, that can uniquely tie the DRM file download to a person, device, or organization. In some embodiments, a buyer identifier may be configured to permit multiple persons within an organization, or multiple devices operated by a single person or multiple persons in the organization, to download and access the particular DRM file involved in the DRM file download reported by the seller application.

Subsequently, the rights management server may create an extended digital rights management (DRM) file access key associated with the DRM file identifier, according to block 330. The extended DRM file access key may be configured to provide short term access (having a key expiration date measured in hours or days) to the transferred DRM file to the buyer on the buyer device, such as may be done when access to a file such as a video file or a music file. In other embodiments, the extended DRM file access key may be configured to provide a buyer with permanent access to the DRM file on the buyer device, consistent with "buying" a movie from an online store, where DRM file access key has a much longer access time, expiring after months, years, or even having no expiration date. Extended DRM file access keys may be configured to correspond with the permissions associated with the buyer identifier (multiple persons, multiple devices, etc.) as well.

The rights management server may then determine whether the buyer device is authorized to receive an extended DRM file access key, as described in block 340. Determining whether a device is authorized to receive or access a DRM file can include verifying that the buyer device is running an approved operating system, or that a buyer account has authorized payment for the downloaded DRM file. Embodiments can also include determining that there are no file format or licensing issues that would bar the generation and transmission of an extended DRM file access key, that a buyer belongs to an authorized group or organization that has a preexisting license to access certain DRM files, and also determining that payment for DRM file access has been received by the online store or rights management server. In some embodiments, an operating system may not have an authorized seller application that can display the downloaded DRM file as well as maintain the digital rights management security (encryption) scheme that has been implemented with the DRM file to prevent unauthorized access to or copying of the DRM file on the buyer device or other devices to which the file may be copied.

When the rights management server determines that the buyer device is not authorized to receive an extended DRM file access key, the process may end, as shown in block 398. In some embodiments, the determination that a buyer device is not authorized to receive an extended DRM file access key may cause the rights management server to send a sale denial package to the buyer device, which may revoke a DRM file access key that was transferred with the DRM file to the buyer device. In other embodiments, the DRM file itself may be deleted from the buyer device upon receiving the sale denial package. The sale denial package may be a collection of files and instructions for an application or operating system that prevents copying of or access to the DRM file while on the buyer device. In some embodiments, the sale denial package may include a more restrictive or more limited DRM file access key, or may include instructions to the operation system or software running on the buyer device to delete the original DRM file access key or replace it with a more restrictive or limited file access key. In certain embodiments, the DRM file itself can be configured to expire after a period of time (a trial period) while the DRM file access key circumvents or cancels the file expiration process built into the DRM file. When the trial period ends without receiving a DRM file access key, the buyer can lose access to the DRM file until a DRM file access key is received from the digital rights management server.

Upon determining that the buyer device is authorized to receive an extended DRM file access key, the rights management server may generate an extended DRM file access key and include the new key (along with other information such as the buyer identifier and the DRM file identifier) in a sale confirmation package that can be sent to the buyer device. The sale confirmation package may be generated a single time and saved on the rights management server, or may be dynamically generated upon each new instance of a seller application communicating to the rights management server that a DRM file transfer has occurred. The extended DRM file access key may be associated, along with the DRM file identifier on the list of authorized DRM files, with a particular buyer identifier in order to facilitate subsequent transfers of DRM file access keys to different buyer devices.

After determining that the buyer device is authorized to receive an extended DRM file access key, the rights management server may send the sale confirmation package to multiple seller applications running on multiple devices. This communication may be performed over a fixed (limited) period of time, or indefinitely. In some embodiments, a sale confirmation package may be transmitted to seller applications that are directly linked to the rights management server and that have a copy of the file package with the DRM file identifier and the buyer identifier in them. In some embodiments, the sale confirmation package may be transmitted to seller applications that are connected to the digital rights management server over a "mesh" or distributed network connection, where intermediate devices are between rights management server and the seller application that performed the file transfer to the buyer device.

A seller application may perform additional functions in response to the digital rights management server performing the steps of the DRM file access method, as described herein. The seller application may receive, subsequent to the rights management server sending, a sale confirmation package that can be retransmitted to the buyer device and authorize the buyer to fully view, run, or access the DRM file that was downloaded. As discussed herein, the sending of the file package to the rights management server and the receiving by the seller application of the sale confirmation package may be performed by a single seller application on a single seller device, or may be distributed to multiple seller devices. In fact, there may be many seller applications among a plurality of seller application that receive a sale confirmation package. Further, from among the plurality of seller applications and seller devices that have received the sale confirmation package, different copies of the seller application that detects the buyer device and sends the sale confirmation package to the buyer device may perform the sale confirmation package transfer.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Embodiments of the seller application running on seller devices can access this shared pool of configurable computing resources in order to transfer information regarding DRM file transfer (sale record, sale confirmation package) to and from a rights management server operating across a network. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
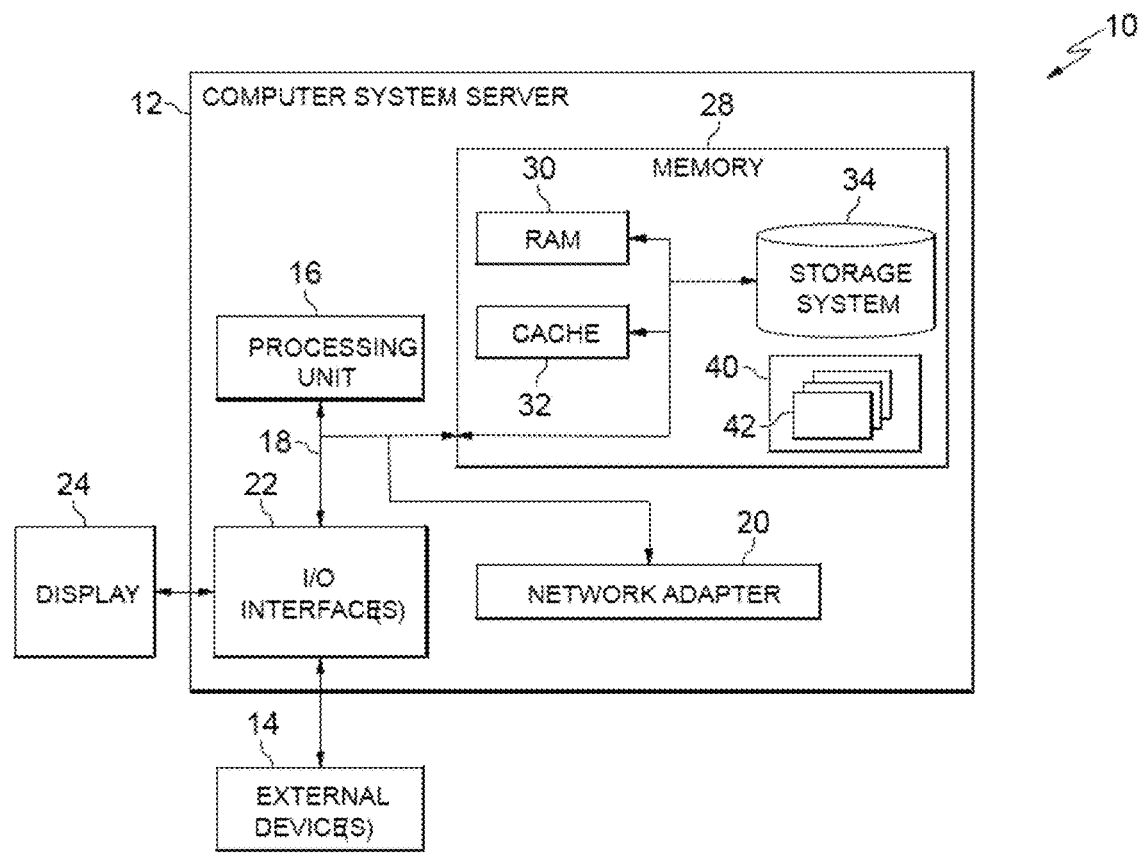
FIG. 4 depicts a cloud computing node according to an embodiment of the present invention.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations.

Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
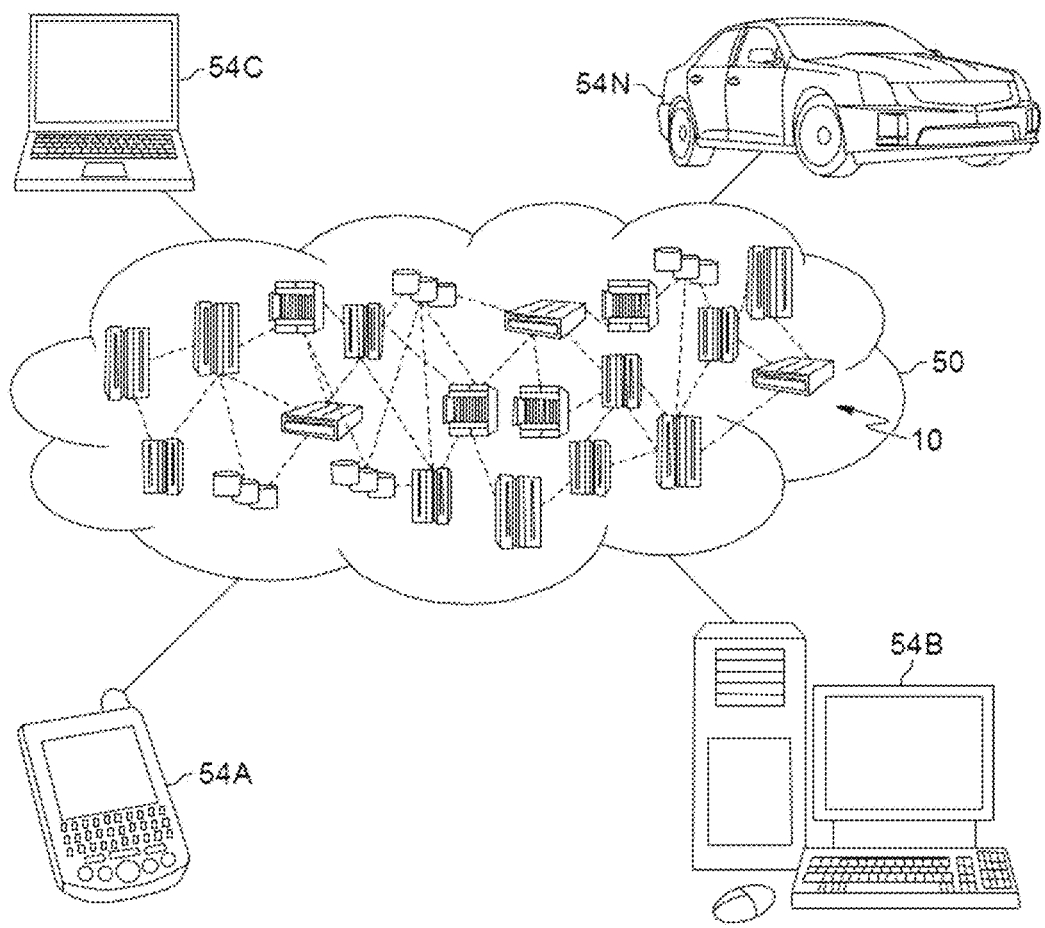
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
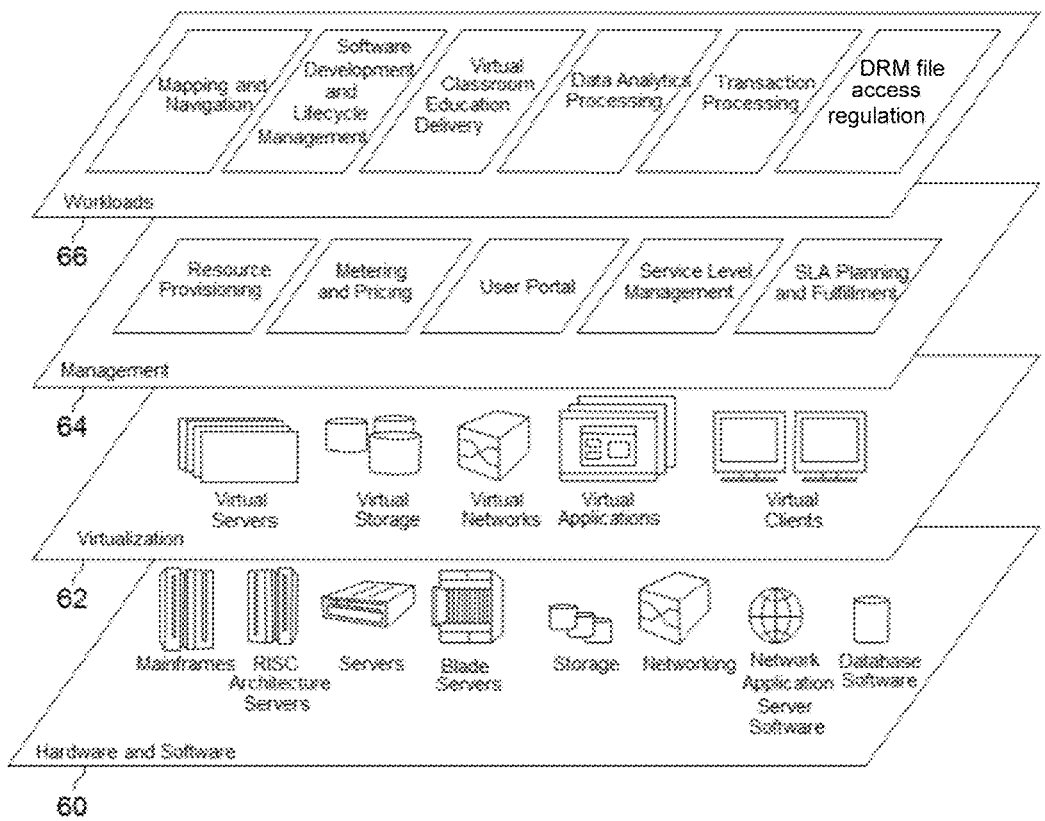
FIG. 6 depicts abstraction model layers according to an embodiment of the present invention.

Referring now to FIG. 6, a set of functional abstraction layers provided by cloud computing environment 50 FIG. 5) is shown. It should be understood in advance that the components, layers, and functions shown in FIG. 6 are intended to be illustrative only and embodiments of the invention are not limited thereto. As depicted, the following layers and corresponding functions are provided: Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and digital rights-managed (DRM) file access regulation. Digital rights-managed file access regulation may include correlating files and users (persons, organizations, etc.) who are authorized to access the files, and may also include generating and retaining copies of access keys that can be used to provide a user with access to DRM files and determining whether the buyer or buyer device is a member of an organization that provides shared or joint access to DRM files for its members.

What is claimed is:

1. A method for providing digital rights managed (DRM) files using at least a first tablet computer and a plurality of tablet computers, wherein the plurality of tablet computers includes a second and third tablet computer, wherein each of the plurality of tablet computers store a list of plurality of DRM files and can receive from the first tablet computer, a sale record generated by another of the plurality of tablet computers, the method comprising:

receiving, by the first tablet computer and from the second tablet computer, a browsing request for a list of a plurality of DRM files stored on the second tablet computer;

providing, by the first tablet computer and in response to the received browsing request, the list of DRM files;

receiving, by the first tablet computer, a request for at least one DRM file of the list of DRM files;

transmitting, by the first tablet computer, the at least one DRM file and a DRM file access key to the second tablet computer;

receiving, by the first tablet computer, a purchasing request from the second tablet computer, wherein the purchasing request includes an identifier of the at least one DRM file and an identifier of the second tablet computer;

sending, by the first tablet computer and in response to the purchasing request, an authorization information request to the second tablet computer;

receiving, by the first tablet computer and in response to the authorization information request, first encrypted authorization information of a user of the second tablet computer;

generating, by the first tablet computer, a sale record comprising the first encrypted authorization information, the identifier of the at least one DRM file, and the second tablet computer identifier, and transmitting the generated sale record to the second tablet computer;

receiving, by a rights management server and from the third tablet computer, the generated sale record;

assessing, by the rights management server, the second tablet computer identifier from the sale record and determining by the rights management server based on the second tablet computer identifier that the DRM file access key is to be deleted from the second tablet computer;

generating, by the rights management server based on the determining that the DRM file access key is to be deleted, delete instructions; and transmitting, by the rights management server, the delete instructions to the second tablet computer.

* * * * *